Patented Dec. 3, 1935

2,022,953

UNITED STATES PATENT OFFICE 2,022,953

VULCANIZATION OF RUBBER

Clyde Coleman, Passaic, N. J., assignor, by mesne assignments, to United States Rubber Company, New York, N. Y., a corporation of New Jersey No Drawing. Application July 14, 1934, Serial No. 735,197

17 Claims. (Cl. 18—53)

This invention relates to the preparation of a new class of chemical compounds and to the resulting products, and to the employment of these compounds in the vulcanization of rubber and other vulcanizable materials.

An object of this invention is to provide chemicals that cause substantially no premature vulcanization on the mill when incorporated with a rubber stock. Another object is to provide chemicals, useful as vulcanization accelerators in mold cures, air cures, or in the vulcanization of stocks in an atmosphere containing ammonia. Another object is to provide chemicals useful as antiscorch agents; that is, by their presence in the rubber they will reduce or prevent premature curing effects caused by ultra or semi-ultra accelerators used in addition to or in conjunction with the said chemicals in the manufacture of vulcanized rubber goods. A further object is to provide vulcanizates that have good ageing properties. Other objects will be apparent from the following description.

For the purposes of illustration the new chemicals are considered to have the probable general formula

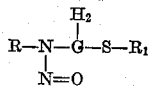

where R is an aryl group (substituted or unsubstituted) and $R_1$ is an arylenethiazyl group. The products may be termed N-nitroso arylaminomethyl arylenethiazyl sulfides and have been found to result from nitrosation of an arylaminomethyl arylenethiazyl sulfide. The latter compound results from reacting a methylene arylimide having the formula $R-N=CH_2$ (R is an aryl group), with a mercaptoarylenethiazole, and has the probable formula

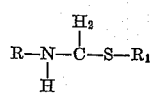

R and $R_1$ being as first defined above; see U. S. P. 1,901,582. Where nitrosation is contemplated, the original aromatic amine corresponding to the aryl-imide portion of the formula just given, is preferably one having at least a dissociation constant of $3.5 \times 10^{-10}$ at 18° C. This is the dissociation constant of aniline which material is used in the preparation of the phenylaminomethyl arylenethiazyl sulfide.

Among the mercaptoarylenethiazoles which may be reacted with a methylene-arylimide are mercaptoarylenethiazoles, such as 2-mercaptobenzothiazole, and homologues and substitution products thereof, for instance 2-mercaptotoluthiazole (sometimes referred to as 2-mercaptotolylthiazole), 2-mercapto-6-nitrobenzothiazole, 2-mercapto-5-nitrobenzothiazole, 2-mercapto-6-chlorobenzothiazole, 2-mercapto-6-ethoxybenzothiazole, 2-mercapto-5-chlorobenzothiazole.

The aforesaid nitrosation is preferably carried out by means of alkyl esters of nitrous acid, such as ethyl nitrite, iso-butyl nitrite, iso proplynitrite, and the like.

The following is given to illustrate the invention, parts being by weight, and is not to be construed as limiting thereof:

*Example 1*.—The reaction product of methylene-aniline and mercaptobenzothiazole, which has the probable formula:

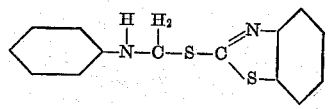

(phenylaminomethyl benzothiazyl sulfide), is treated with ethyl nitrite. A specific example of the process is as follows:

One gram-molecular weight, 272 grams, of the above compound (from methylene-aniline and mercaptobenzothiazole), melting at about 114° C., is added to about one liter of benzol. These relative amounts of solvent and solute leave part of the solute undissolved. The vessel containing the above mixture is cooled to about 10° C., and gaseous ethyl nitrite is led into it. It is not necessary that the end of the delivery tube should extend below the surface of the liquid; it may terminate in the space above it. After expulsion of the air above the liquid, and upon stirring the reaction mass, the ethyl nitrite is rapidly absorbed, and continues to be absorbed until substantially one gram molecular weight, or 75 grams, has been taken up. At this point, no more ethyl nitrite will be absorbed, and back pressure begins to be built up. The end of the reaction is thereby plainly indicated.

The precipitated material is filtered from the benzol, and is washed with a little benzol, and then with alcohol. The yield is about 65% of theoretical, that is about 195 grams. (The molecular weight of the nitroso body is 301.)

Or the following method may be used for making the product:

One gram molecular-weight, 272 grams, of the reaction product of methylene-aniline and mercaptobenzothiazole (melting at about 114° C.) in a finely divided condition, is placed in a flask. This flask is immersed in ice water and ethyl nitrite led in as before, preferably with stirring over the solid material, until an increase in weight of substantially 75 grams is noted, corresponding to one gram molecular weight of ethyl nitrite absorbed. The contents of the flask are then spread out on paper, and the ethyl alcohol which has been liberated during the nitrosation is allowed to evaporate. The weight of the dried material is almost exactly the theoretical, that is, 301 grams, after drying. On suspending the product in alcohol, warming gently, cooling and filtering, for the purpose of purification, a yield of about 85 percent of the theoretical is usually recovered.

A third method of making these compounds is illustrated as follows:

One gram molecule of phenyl amino methyl benzothiazyl sulfide is mixed with about one liter of benzol. To this mixture is added a solution of 69 grams of sodium nitrite in water. With good agitation, a solution of dilute hydrochloric or other acid is added; the temperature is controlled at 10°–15° C. When all the acid is added, stirring is continued for a time. The water solution of sodium salt formed by the action of the acid on the sodium nitrite is separated from the benzol, and the benzol evaporated. The residue which is likely to remain liquid contains N-nitroso phenyl amino methyl benzothiazyl sulfide, mixed with by-products. On adding alcohol to this residue, crystallization of the mass sets in at once and a fairly pure product is obtained, since the impurities are soluble in alcohol. On filtering and drying, a yield of 30–40% of theory is usually found to be present.

The structural formula of the nitrosated product is believed to be:

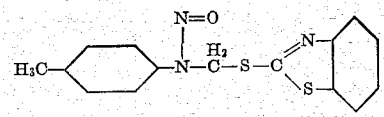

It may be termed N-nitroso-phenylaminomethyl benzothiazyl sulfide.

This compound is soluble in hot benzol, toluol, and other aromatic hydrocarbons, but practically insoluble in hot alcohol. On slowly raising the temperature during melting point measurement, the body melts with decomposition at about 148° C. On more rapid raising of the temperature, the body melts at a higher temperature, with, of course, decomposition.

Analytical figures are as follows:

|  | Found | Calculated |
| --- | --- | --- |
|  | Percent | Percent |
| Sulfur | 21.25 | 21.30 |
| Nitrogen | 14.00 | 14.30 |

The use of this chemical as an accelerator of the vulcanization of rubber is shown below (rubber mix B), in comparison with the parent compound from which it was derived (mix A).

The accelerators were incorporated into rubber mixes having the following compositions:

|  | A | B |
| --- | --- | --- |
| Rubber | 100 | 100 |
| Carbon black | 42 | 42 |
| Sulfur | 3.25 | 3.25 |
| Zinc oxide | 10 | 10 |
| Stearic acid | 4 | 4 |
| Pine tar | 3.5 | 3.5 |
| Phenylaminomethyl benzothiazyl sulfide | .8 |  |
| N-nitrosophenyl aminomethyl benzothiazyl sulfide |  | .8 |

Portions of these mixes were press-cured at temperatures corresponding to the gauge steam pressures indicated, and then tested for tensile strength, with the following results:

| Cure | Tensile strength (lbs./sq. in.) | |
| --- | --- | --- |
|  | A | B |
| 60′ at 5# steam | 1738 | 733 |
| 120′ at 5# steam | 3162 | 1652 |
| 30′ at 30# steam | 3778 | 3482 |
| 45′ at 30# steam | 3977 | 4016 |
| 60′ at 30# steam | 4235 | 4348 |
| 75′ at 30# steam | 4032 | 4272 |
| 90′ at 30# steam | 4093 | 3939 |

The data clearly show the accelerating power and the non-scorching property of the new product.

*Example 2.*—The corresponding product N-nitroso-p-tolylaminomethyl benzothiazyl sulfide is formed by nitrosating the reaction product of methylene para-toluidine and mercaptobenzothiazole, and is believed to have the structural formula:

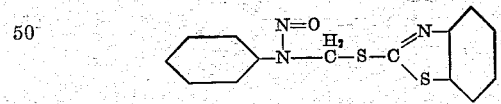

This product may be formed by exactly the same processes as above described, and melts at about 138° C., with decomposition.

This chemical was employed as the accelerator in a rubber composition like that described above, 0.7 part of the product being used (mix D), in comparison this time with 0.8 part of mercaptobenzothiazole (mix C), with the following results:

| Cure | Tensile strength (lbs./sq. in.) | |
| --- | --- | --- |
|  | C | D |
| 60′ at 5# steam | 702 | 778 |
| 120′ at 5# steam | 2067 | 1530 |
| 30′ at 30# steam | 4075 | 3625 |
| 45′ at 30# steam | 4387 | 3930 |
| 60′ at 30# steam | 4407 | 4250 |
| 75′ at 30# steam | 4327 | 4225 |
| 90′ at 30# steam | 4172 | 3928 |

While the invention is illustrated with the use in rubber of products resulting from the use of aniline and para-toluidine, it will be recognized that the products prepared by using other aryl-amines, that is the homologues and analogues of aniline and p-toluidine, fall fairly within the present invention. As concerns their use in rubber, the chemicals are not to be restricted to the particular mode of preparing them as set forth in detail above, and the claims are to be construed as covering the use of the compounds when prepared in other manners. It will also be apparent to those skilled in the art that certain modifications in the amounts and materials specified in the examples may be made without departing from the scope of the invention, as may be required in the use of impure or commercial grades in place of chemically pure materials.

The invention is useful in connection with any method of curing rubber or rubber-like goods or compounds. The materials may be added or incorporated with the rubber at any time prior to the actual vulcanizing operation and may be used with any desired antioxidants, softeners and other compounding ingredients, and are particularly useful as anti-scorches to be employed along with some other desirable accelerator known to cause scorching when used alone, such as zinc dimethyl dithiocarbamate.

The presence of zinc oxide and fatty acids or their equivalents is particularly desirable.

The use of these chemicals as anti-scorching agents with an ultra-accelerator, for instance, zinc dimethyl dithiocarbamate, is illustrated below.

Three mixes of the following composition were prepared. The parts being by weight:

|  | E | F | G |
|---|---|---|---|
| Rubber | 100 | 100 | 100 |
| Stearic acid (softener) | 1 | 1 | 1 |
| Phenyl beta naphthylamine (antioxidant) | 1 | 1 | 1 |
| Zinc oxide | 5 | 5 | 5 |
| Sulfur | 2.5 | 2.5 | 2.5 |
| Zinc dimethyl dithiocarbamate | 0.10 | 0.10 |  |
| N-nitroso phenylamino-methyl benzothiazyl sulfide |  | 1.00 | 1.00 |

Portions of these three mixes were cured simultaneously in a mold for 45′ at 5 pounds steam pressure, and for 5, 10-20-30-45 and 60 minutes at 20 pounds steam pressure. These cured stocks were then tensiled. Below are the tensile strengths expressed in pounds per square inch of the different cures.

|  | Mix E | Mix F | G |
|---|---|---|---|
| 45′ at 5# steam pressure | 3286 | not cured. | not cured. |
| 60′ at 5# steam pressure | 3745 | 3861 | not cured. |
| 90′ at 5# steam pressure | 3879 | 4385 | 2313 |
| 5′ at 20# steam pressure | 2856 | not cured. | not cured. |
| 10′ at 20# steam pressure | 3329 | not cured. | not cured. |
| 20′ at 20# steam pressure | 3571 | 4257 | 1318 |
| 30′ at 20# steam pressure | 3750 | 4992 | 3726 |
| 45′ at 20# steam pressure | 3433 | 4289 | 4367 |
| 60′ at 20# steam pressure | 3789 | 4542 | 4342 |

It is plain that the N-nitroso phenylaminomethyl benzo thiazyl sulfide, although itself a powerful accelerator, has delayed for a time the accelerating action of the zinc dimethyl dithiocarbamate, since it has completely prevented the cure of mix F when heated in the mold for 5 minutes and 10 minutes at 20# steam pressure.

The term "rubber" is to be construed broadly and as including other vulcanizable materials such as synthetic rubber, balata, gutta percha, etc.

The new chemicals disclosed may be used in the preparation of inner tubes, tires, thread, hose, dipped goods, mechanical goods, etc.

With the detailed description given above, it will be obvious that modifications will suggest themselves without departing from the principle of the invention, and it is not desired to limit the invention otherwise than as set forth in the appended claims.

Having thus described my invention what I claim and desire to protect by Letters Patent is:

1. A process of manufacturing a vulcanized rubber product which comprises mixing a vulcanizable rubber stock with an N-nitrosoarylaminomethyl arylenethiazyl sulfide.

2. A process of producing vulcanized rubber goods which comprises treating a rubber sulphur mix with an accelerator composition comprising an ultra-accelerator of vulcanization and an N-nitroso-arylaminomethyl arylenethiazyl sulphide.

3. A process of manufacturing a vulcanized rubber product which comprises mixing a vulcanizable rubber stock with an N-nitroso-phenylaminomethyl arylenethiazyl sulphide.

4. A process of manufacturing a vulcanized rubber product which comprises mixing a vulcanizable rubber stock with an N-nitroso-phenylaminomethyl benzothiazyl sulphide.

5. A process of manufacturing a vulcanized rubber product which comprises mixing a vulcanizable rubber stock with an N-nitroso-p-tolylaminomethyl arylenethiazyl sulphide.

6. A process of manufacturing a vulcanized rubber product which comprises mixing a vulcanizable rubber stock with N-nitroso-p-tolylaminomethyl benzothiazyl sulphide.

7. A rubber vulcanization accelerator material comprising an N-nitroso-arylaminomethyl arylenethiazyl sulphide.

8. A rubber vulcanization accelerator material comprising an N-nitroso-arylaminomethyl benzothiazyl sulphide.

9. A rubber vulcanization accelerator material comprising N-nitroso-phenylaminomethyl benzothiazyl sulphide.

10. A rubber vulcanization accelerator material comprising N-nitroso-p-tolylaminomethyl benzothiazyl sulphide.

11. As new compounds which are suitable in the vulcanization of rubber materials having the general formula

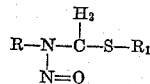

where R is an aryl group and $R_1$ is an arylenethiazyl group.

12. A compound having the general formula $R-S-R_1$ wherein R is an arylamino methylene group in which the amino nitrogen atom is connected to a nitroso radical, and $R_1$ is an arylenethiazyl group.

13. A process of producing vulcanized rubber goods which comprises vulcanizing the rubber in the presence of a compound as set forth in claim 12.

14. A vulcanizable rubber composition containing an N-nitroso-arylaminomethyl arylenethiazyl sulfide.

15. A vulcanizable rubber composition containing a compound having the general formula $R-S-R_1$ wherein R is an arylamino methylene group in which the amino nitrogen atom is connected to a nitroso radical, and $R_1$ is an arylenethiazyl group.

16. Vulcanized rubber resulting from vulcanizing the composition set forth in claim 14.

17. Vulcanized rubber resulting from vulcanizing the composition as set forth in claim 15.

CLYDE COLEMAN.